United States Patent
Maehata et al.

(10) Patent No.: US 8,347,452 B2
(45) Date of Patent: Jan. 8, 2013

(54) VEHICLE VACUUM MODULE

(75) Inventors: Hiromitsu Maehata, Troy, MI (US);
Delomer Gosioco, Royal Oak, MI (US)

(73) Assignee: DENSO International America, Inc., Southfield, MI (US)

( * ) Notice: Subject to any disclaimer, the term of this patent is extended or adjusted under 35 U.S.C. 154(b) by 730 days.

(21) Appl. No.: 12/414,078

(22) Filed: Mar. 30, 2009

(65) Prior Publication Data

US 2010/0242206 A1 Sep. 30, 2010

(51) Int. Cl.
*A47L 5/38* (2006.01)
*A47L 15/00* (2006.01)
*A47L 9/00* (2006.01)

(52) U.S. Cl. ........................ 15/313; 15/327.2
(58) Field of Classification Search ............... 15/313, 15/327.2
See application file for complete search history.

(56) References Cited

U.S. PATENT DOCUMENTS

| | | | | |
|---|---|---|---|---|
| 1,455,933 A * | 5/1923 | Peterman | | 15/313 |
| 1,464,080 A * | 8/1923 | Langdon | | 15/313 |
| 1,777,514 A * | 10/1930 | Burgin | | 137/335 |
| 2,218,265 A * | 10/1940 | Nathan | | 180/68.3 |
| 2,277,568 A * | 3/1942 | Vincent | | 237/1 R |
| 2,643,482 A * | 6/1953 | Wilson | | 43/140 |
| 2,725,587 A * | 12/1955 | Coles | | 15/313 |
| 2,851,156 A * | 9/1958 | Thompson | | 180/89.11 |
| 3,648,837 A * | 3/1972 | Ogle | | 180/89.11 |
| 3,841,553 A * | 10/1974 | Taylor | | 237/12.3 R |
| D346,051 S | 4/1994 | Freiwald et al. | | |
| 7,152,272 B2 | 12/2006 | Rukavina et al. | | |
| 2003/0192334 A1* | 10/2003 | Kawauchi et al. | | 62/244 |
| 2004/0154122 A1* | 8/2004 | Xu | | 15/313 |

* cited by examiner

*Primary Examiner* — Bryan R Muller
(74) *Attorney, Agent, or Firm* — Harness, Dickey & Pierce, P.L.C.

(57) ABSTRACT

A vehicle vacuum cleaning system may have a portable vacuum module that employs a vacuum module case, a vacuum fan within the interior of the vacuum module case and a vacuum fan drive shaft coupled to the vacuum fan. The vacuum module attaches and detaches to an HVAC module within the vehicle. The HVAC module may utilize an HVAC case, an electric motor within the HVAC case, an HVAC fan drive shaft coupled to the electric motor and an HVAC fan coupled to the HVAC fan drive shaft. The vacuum fan drive shaft is adapted to receive rotational energy from the HVAC fan drive shaft, either directly or through an auxiliary shaft. The vacuum module may employ gears to increase the speed and drawing force of the vacuum fan. A debris receptacle is detachable to the vacuum module. The HVAC fan drive shaft ultimately drives the vacuum fan.

7 Claims, 6 Drawing Sheets

US 8,347,452 B2

VEHICLE VACUUM MODULE

FIELD

The present disclosure relates to a portable vacuum module that may be powered by a motor of a heating, ventilating and air-conditioning module located within a vehicle.

BACKGROUND

This section provides background information related to the present disclosure which is not necessarily prior art. Vacuum devices for suctioning debris from upholstery and carpeting within the interior of the vehicles are known. In one such device, a hose is attached to a conventional, household vacuum cleaner and used to suction debris from the interior of a vehicle. Such household vacuum cleaners utilize electric motors that operate on standard 120 volt household current. U.S. Pat. No. 7,152,272 discloses an on-board vehicle vacuum cleaner that mounts between front seats of a vehicle and utilizes an electric motor dedicated to the vacuum cleaner. While such vacuum cleaning devices have been satisfactory for their given applications, they are not without their share of limitations. One limitation of known cleaning devices is their use of an on-board electric motor and necessitation of a power cord to supply electricity to power the on-board electric motor. An electric motor adds weight and cost to the vacuum device while a power cord adds inconvenience and cost.

SUMMARY

This section provides a general summary of the disclosure, and is not a comprehensive disclosure of its full scope or all of its features. A vehicle vacuum cleaning system may employ a portable vacuum module and an HVAC module. The portable vacuum module may engage the HVAC module with a shaft, and the portable vacuum module may attach to the HVAC module. The portable vacuum module may have a vacuum module case that defines a vacuum module case interior, a vacuum fan within the interior of the vacuum module case, a vacuum fan drive shaft coupled to the vacuum fan, a vacuum hose attached to the vacuum module case, and a detachable canister that attaches to or is integrally molded with the vacuum module case. The detachable canister may capture dust and debris from within the vehicle, such as from carpeting and upholstery, that is drawn through the vacuum hose.

With no electric motor within the portable vacuum module, rotational energy for turning the vacuum fan is received from an electric motor within the HVAC case, which also rotates an HVAC fan. The HVAC module may have an HVAC case that defines an aperture through which air may be drawn into the HVAC case for normal HVAC operation. The electric motor may be disposed within the HVAC case with the HVAC fan drive shaft coupled to the electric motor. The HVAC fan may be coupled to the HVAC fan drive shaft and for portable vacuum module operation, the HVAC fan drive shaft may couple to the vacuum fan drive shaft. Alternatively, the second gear drive shaft may be adapted to receive rotational energy from the HVAC fan drive shaft when the vacuum module is attached to the HVAC module. The vacuum module case may fit into an aperture defined in the HVAC case or an aperture defined in the interior panel for operation of the vacuum module.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
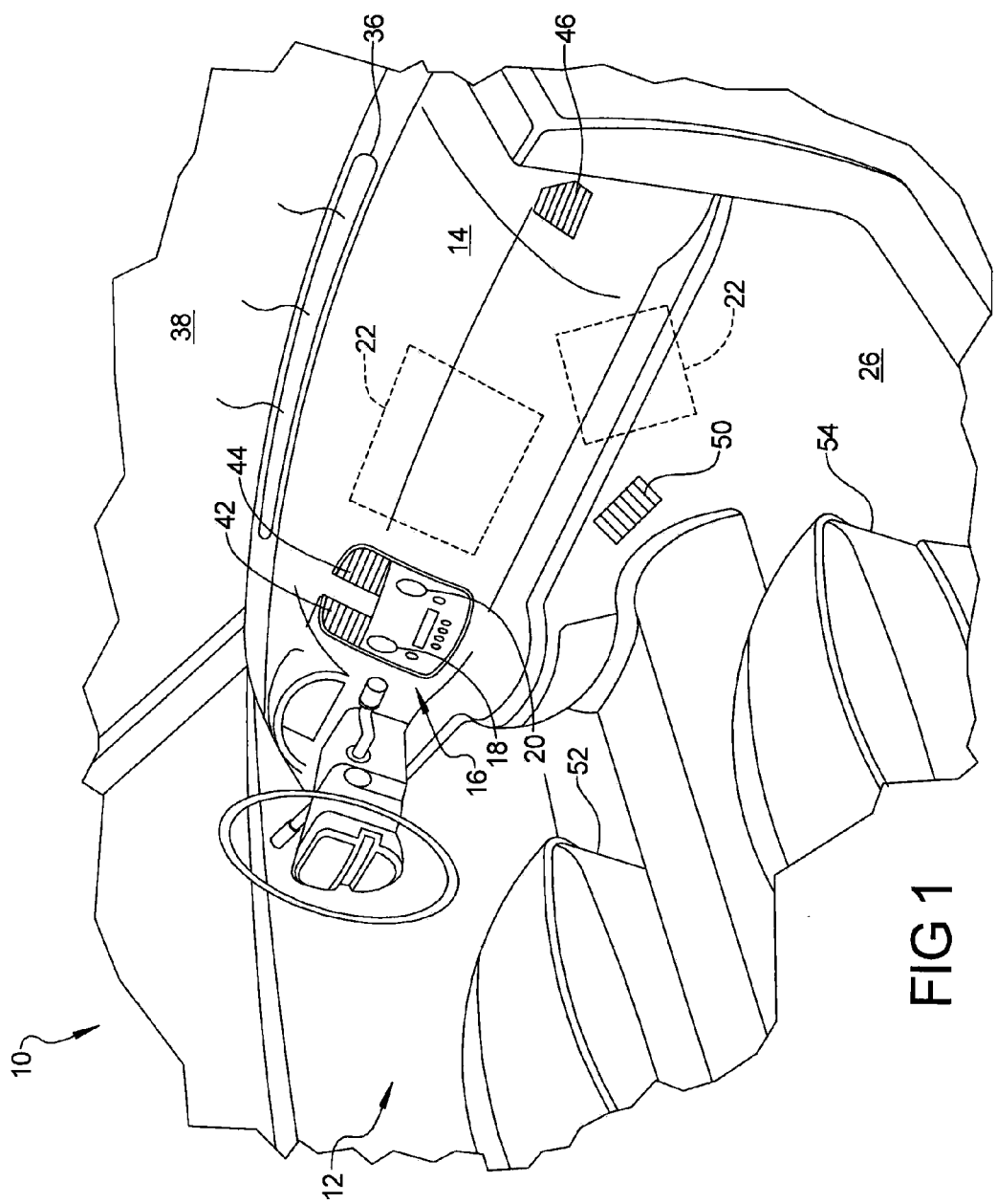
FIG. 1 is a perspective view of an interior of a vehicle depicting potential locations of an HVAC unit.
Figure 2:
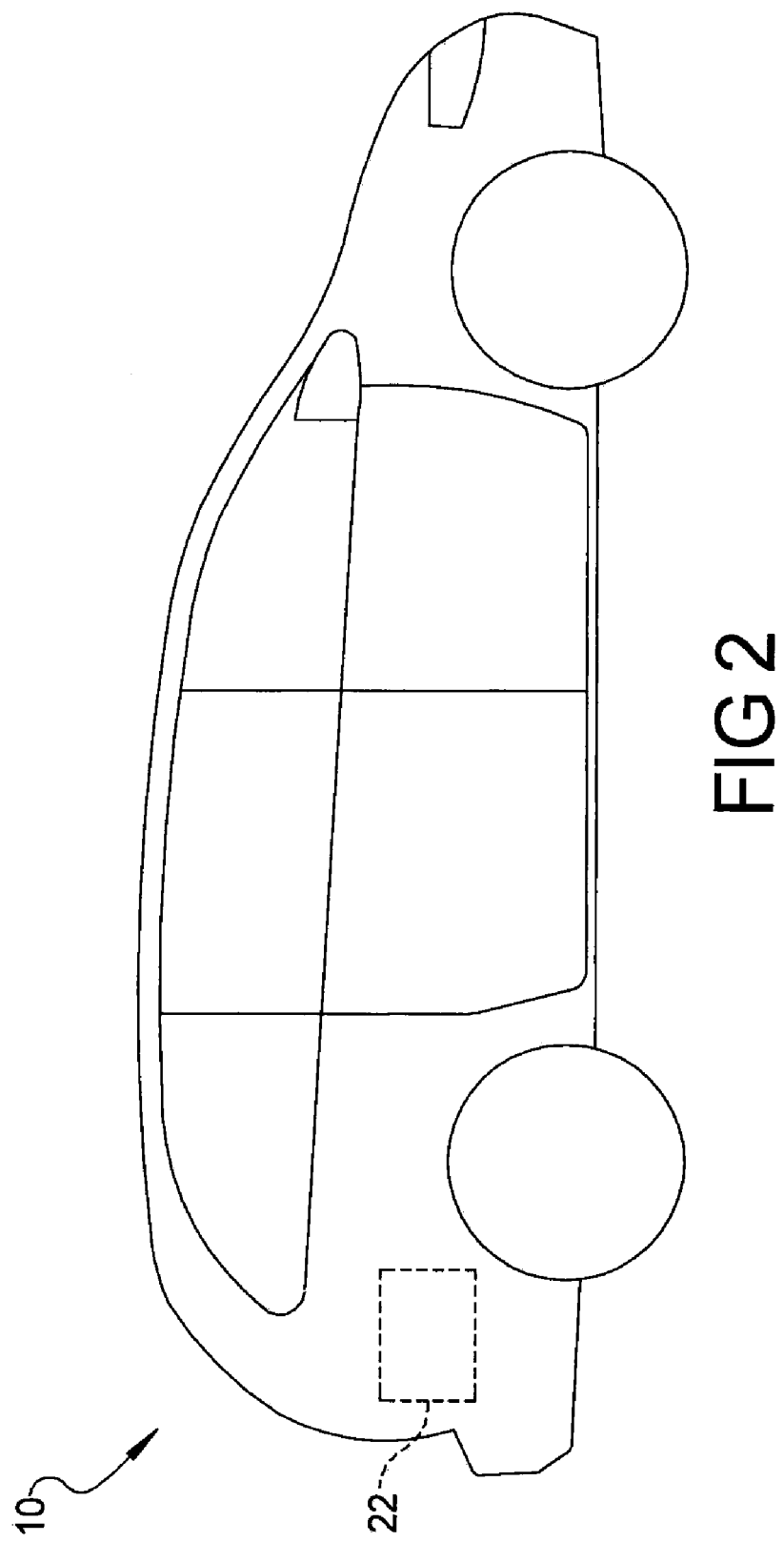
FIG. 2 is a side view of a vehicle depicting a potential location of an HVAC unit.

Example embodiments will now be described more fully with reference to the accompanying drawings. With reference to FIGS. 1-7, teachings of the present disclosure will be presented. Turning first to FIG. 1, vehicle 10 has a vehicle interior 12 with a dash 14 that exhibits a heating, ventilating and air-conditioning ("HVAC") control panel 16. HVAC control panel 16 may possess first knob 18 and second knob 20 to control functions of an HVAC module 22. As depicted in FIG. 1, HVAC module 22 may be located immediately behind dash 14, such as behind HVAC control panel 16, or in an alternative location, HVAC module 22 may be located closer to vehicle interior floor 26. One reason for positioning HVAC module 22 closer to interior floor 26 is for access by a vacuum module, in accordance with teachings of the present disclosure, which will be discussed in greater detail later.

Figure 3:
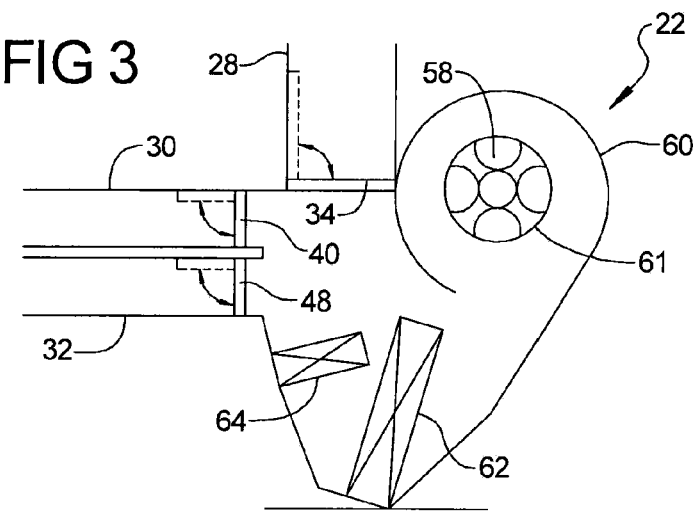
FIG. 3 is a side view of an HVAC case depicting a fan, evaporator, heater core, and associated ducting for interior discharge vents.

HVAC modules may be positioned in various positions in vehicle 10, and the teachings of the present disclosure may be applicable to an HVAC module 22 regardless of location. For instance, FIG. 3 depicts an HVAC module 22 located in a rear of vehicle 10. Continuing with reference to FIG. 1, first knob 18 may be used to control fan speed settings of a fan within an HVAC module 22. In addition to first knob 18, second knob 20 may be used to control door positions of doors within HVAC module 22. With reference now including FIG. 3, HVAC module 22 may have various vent ducts that direct air to specific vent outlets within vehicle interior 12. For example, second knob 20 may control opening and closing of defroster duct 28, face duct 30, and foot duct 32. More specifically, defroster duct 28 may have a defroster door 34 that is controllable between open and close positions to permit air to flow through defroster duct 28 and from defroster outlet 36 to permit air to strike interior surface of windshield 38. Similarly, second knob 20 may control face duct 30, which may have a face door 40 that is controllable between open and close positions to permit air to flow through face duct 30 and from face outlets 42, 44, 46 to permit air to directly strike the faces and bodies of vehicle occupants. Moreover, second knob 20 may control foot duct 32, which may have a foot door 48 that is controllable between open and close positions to permit air to flow through foot duct 32 and from foot outlets, such as foot outlet 50, to permit air to be directed to a vehicle interior floor 26 to warm the feet and lower extremities of vehicle occupants. Additional foot outlets may be located throughout the vehicle, such as under the dash 14 and under front seats 52, 54.

Continuing with FIG. 3, HVAC module 22 may have a blower or fan 58 located within an HVAC case 60, which guides blown air over and through evaporator 62 and heater core 64 as required according to a set air temperature that may be set using HVAC control panel 16. As further depicted in FIGS. 2 and 4, the HVAC module 22 may be located in a rear area of vehicle 10, such as an auxiliary HVAC module for heating and cooling a rear area of vehicle 10. In one example, HVAC module 22 may be located within an interior space 74 between exterior panel 66, which may be a vehicle rear quarter panel, and interior panel 68 and be mounted to brackets. More specifically, the HVAC case 60 may mount to brackets. In such a mounting location, HVAC module 22 may have ducts 28, 30, 32 that direct air to various rear areas, in much the same way as when HVAC module 22 is mounted near dash 14 of vehicle 10, as depicted in FIG. 1.

Figure 4:
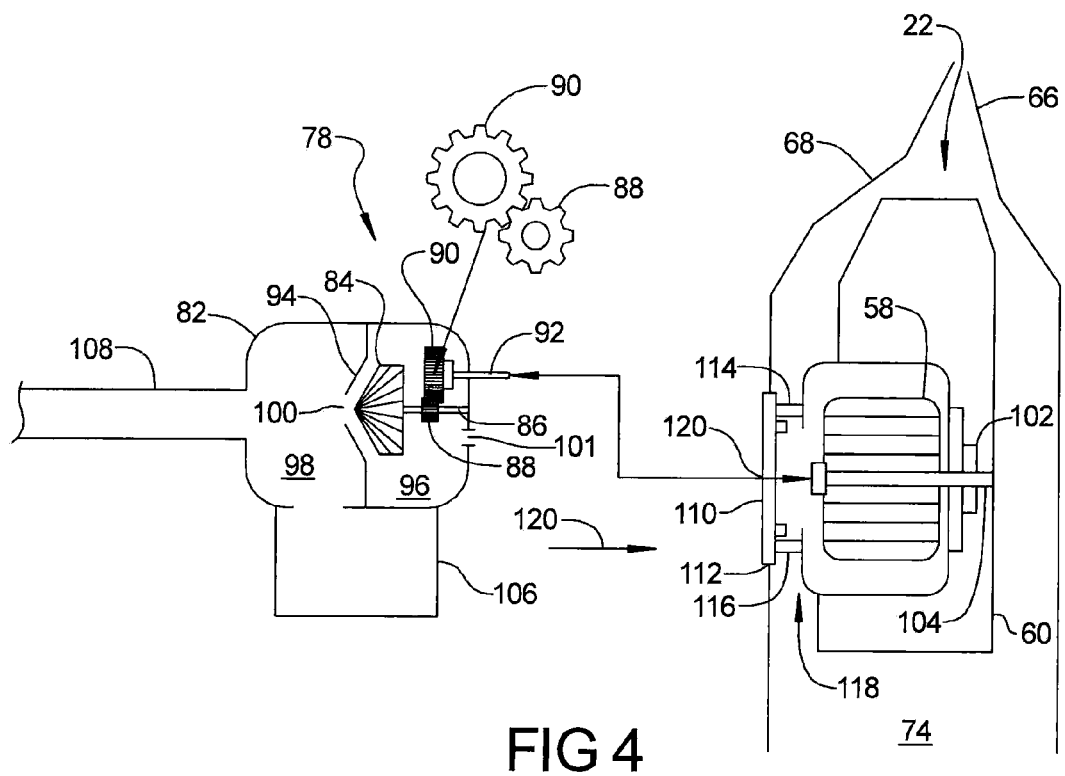
FIG. 4 is a rear view of an HVAC case and a vacuum module depicting an example of how the vacuum module may attach to the HVAC case.

With reference now including FIG. 4, HVAC module 22 may be equipped with aperture 76 to accommodate a vacuum module 78. More specifically, vacuum module 78 may be a separate, portable unit from HVAC module 22 and may be mechanically and fluidly coupled to the HVAC module 22 by passing a portion of vacuum module 78 through aperture 80 in interior panel 68 and over or around aperture 76 of HVAC module 22. With such a connection, portable vacuum module 78 may be connected to HVAC module 22 to thereby utilize the drawing or suction force created when shaft 104 ultimately drives the vacuum fan 84 so that vacuum module 78 may be utilized as a vacuum cleaner, such as within vehicle 10. More specifically, vacuum module 78 may employ a vacuum module case 82, within which a vacuum module fan 84 may mount to a vacuum fan drive shaft 86. A first gear 88 may be mounted to the vacuum fan drive shaft 86 and engage a second gear 90, which may be larger than the first gear 88, that is mounted to a second gear drive shaft 92. The second gear drive shaft 92 may pass through and protrude from the vacuum module case 82. Within the vacuum module case 82, a vacuum module wall 94 may divide the vacuum module case interior into a first chamber 96, occupied by the vacuum fan 84, and an unoccupied second chamber 98. The vacuum module wall 94 may have a hole 100 through which air is drawn from the empty chamber 98 and into the vacuum fan 84. An air exit vent or air exit hole 101 may be located in the wall bounding the first chamber 96 to permit the free flow of air through the first chamber 96 and facilitate vacuum force of the vacuum fan 84.

Continuing with reference to FIG. 4, an electric motor 102 may be disposed within the HVAC case 60 with an HVAC fan drive shaft 104 coupled to the electric motor 102 and HVAC fan 58. HVAC fan drive shaft 104 may be used to drive the vacuum module fan 84, with some mode of power transmission. Vacuum module case 82 may couple onto the HVAC case with the vacuum fan drive shaft 86 adapted to receive rotational energy from the HVAC fan drive shaft 104. Alternatively, to achieve the advantage of an increase in rotational speed of the vacuum module fan 84, as depicted in FIG. 4, second gear drive shaft 92 may couple to HVAC fan drive shaft 104. The vacuum module case 82 may employ a detachable canister 106 that attaches to vacuum module case 82 to capture dust and debris from within vehicle 10 that is drawn in through a vacuum hose 108 that attaches to the vacuum module case 82. A filter may be positioned over hole 100 to prevent fan 84 from becoming clogged with dust and debris, yet let air pass through to create the suction force necessary to facilitate use as a vacuum device. Dust and debris will strike the filter over the hole 100 and drop into detachable canister 106.

Vacuum fan drive shaft 86 or second gear drive shaft 92 of vacuum module 78 couples to HVAC fan drive shaft 104 to receive rotational energy from HVAC fan drive shaft 104. Additionally, vacuum module case 82 may attach to HVAC case 60, interior panel 68, or a structure that directly or indirectly attaches to HVAC case 60 or interior panel 68 by moving vacuum module case 82 in accordance with arrow 120. With reference to FIGS. 4-7, structures that may be used to attach or position vacuum module 78 to receive rotational energy from HVAC fan drive shaft 104 will be discussed. FIG. 4 depicts a barrier or intake stopper 110 that acts as a door to cover interior panel aperture 112. The intake stopper 110 may be biased into position with springs 114, 116 to bias the stopper over aperture 112 when vacuum module 78 is not in use. Although only two springs 114, 116 are depicted, additional springs may be used, such as three or four springs, to bias the intake stopper 110 to a closed position, such as against the exterior panel 68. When the intake stopper 110 is biased against the interior panel 68, air can not enter through aperture 112 and instead, air enters HVAC case 60 through a passage used when HVAC module 22 normally operates, such as via route 118. A hole 120 in intake stopper 110 permits shaft 92 (or shaft 86, depending upon configuration) to pass through intake stopper 110.

Figure 5:
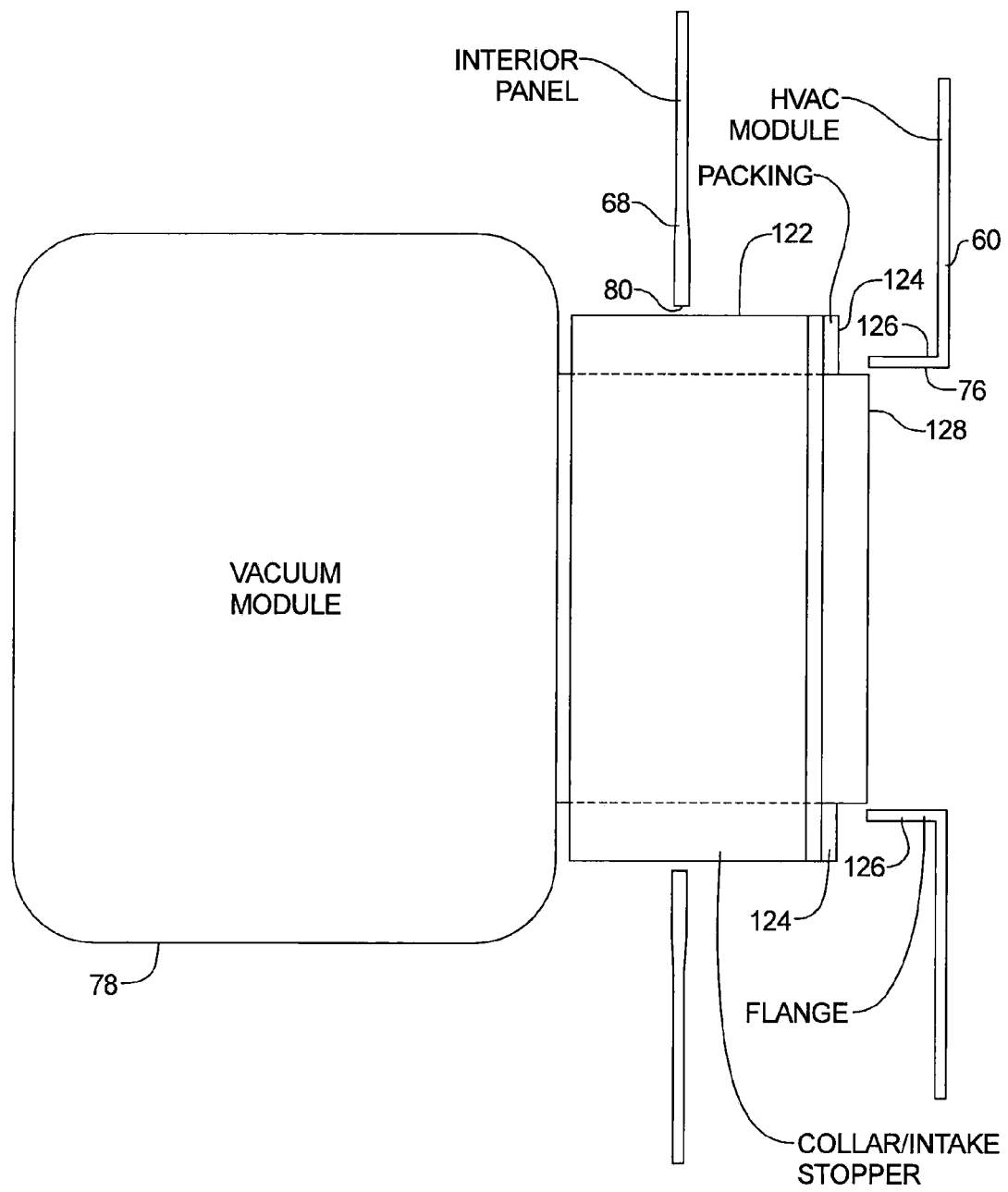
FIG. 5 is a rear view of an HVAC case and a vacuum module depicting an example of how the vacuum module may attach to the HVAC case.

FIG. 5 depicts an example of how vacuum module case 82 may engage HVAC module case 60. A collar 122 may surround a vacuum module extension 128. Collar 122 may be slidable on extension 128 while packing material 124 may be attached to collar 122. Packing material 124 may contact HVAC case 60 to create a seal to prevent airflow from gaining entry to HVAC module 22 in the area of packing material 124, when HVAC fan 58 is operating. Moreover, upon sliding of collar 122 with packing material 124 against HVAC case 60, collar 122 may be rotated to lock or secure collar 122 into position against HVAC case 60. Packing material 124 may be compressible, resilient and have a coefficient of friction with HVAC case 60 to facilitate rotation of collar 122 relative to HVAC case 60, such as to a flange 126 about aperture 76 of HVAC case 60. Depending upon the actual configuration of vacuum module 78 and interior trim panel 68 utilized, a separate, and perhaps matching, detachable panel piece may be necessary to cover aperture 80, for example, when vacuum module 78 is not connected to the HVAC module 60.

Figure 6:
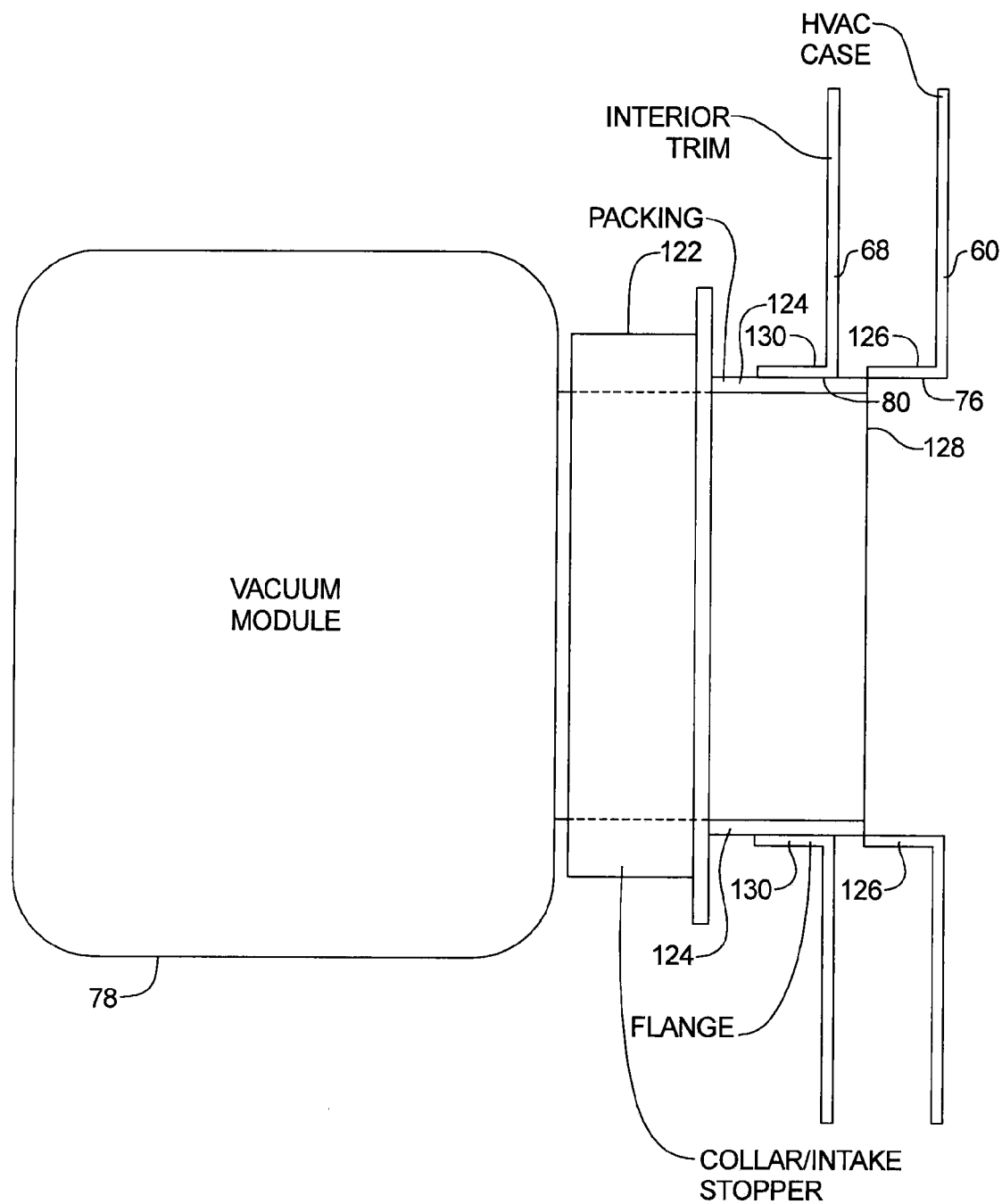
FIG. 6 is a rear view of an HVAC case and a vacuum module depicting an example of how the vacuum module may attach to the HVAC case.

FIG. 6 depicts an attachment scenario similar to that depicted in FIG. 5; however, in FIG. 6, collar 122 and packing material 124 mount to interior panel 68, either to a flat surface of interior panel 68 or a protruding flange 130, or both. Vacuum module extension 128 of vacuum module 78 may protrude through aperture 80 of interior panel 68 and into or through aperture 76 of HVAC case 60. Moreover, upon sliding of collar 122 with packing material 124 against interior panel 68 and flange 130, collar 122 may be rotated to lock or secure collar 122 into position against interior panel 68 or flange 130. Packing material 124 may compress, be resilient and have a coefficient of friction with interior panel 68 or flange 130 to facilitate rotation of collar 122 relative to interior panel 68. The packing material 124 may also contact or abut flange 126 of HVAC case 60 to prevent air form passing between interior trim panel 68 and flange 126 of HVAC case 60 when vacuum module 78 is installed.

Figure 7:
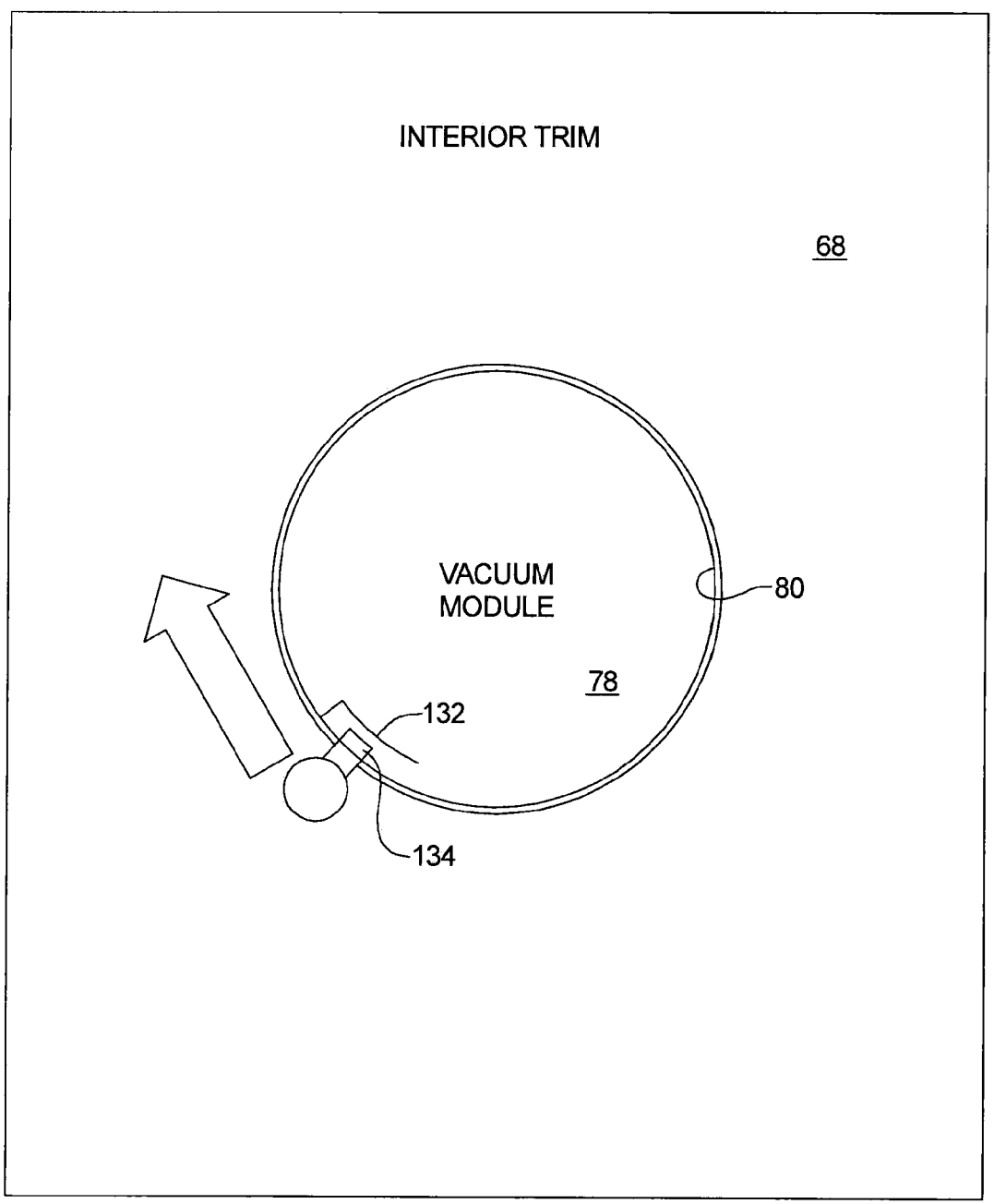
FIG. 7 is a view from an interior of the vehicle looking into the vacuum module receptacle depicting an example of how the vacuum module may attach to the interior trim.

FIG. 7 depicts yet another attachment scenario of vacuum module 78 to interior panel 68. More specifically, interior panel 68 may have part of a mechanism, such as a tab 134 that is attached to interior panel 68 and rotatable around a portion of aperture 80 and that interacts with another part of the mechanism, such as a wall 132 that is attached to vacuum module 78 and protrudes into aperture 80 of interior panel 68.

During operation of vacuum module 78, such as when vacuum module 78 is inserted into or engaged with HVAC case 60, one of knobs 20, 22 on dash 14 may be turned or adjusted to close defroster door 34, face door 40, and foot door 48. Of course other devices or methods of closing doors 34, 40, 48 may be used instead of knobs on a dash. Regardless of how doors 34, 40, 48 are closed, when doors 34, 40, 48 are closed, HVAC module 22 is prevented from forcing air through any duct and the HVAC fan 58 will simply spin or rotate within its sealed case 60. However, in accordance with the present disclosure, the rotational energy of HVAC fan drive shaft 104, powered by electric motor 102, may be utilized by vacuum module 78. More specifically, depending upon the configuration desired, one of the vacuum fan drive shaft 86 or the second gear drive shaft 92 will engage the HVAC fan drive shaft 104. The speed and available torque of motor 102 will depend upon which shaft 86, 92 may provide the desired performance from vacuum module 78. While the transmission of power from the HVAC module to the vacuum module 78 is generally described using shafts and gears, other modes of power transmission are possible, such as pulleys with flexible belts or even chains.

What has been described is a vehicle vacuum cleaning system that employs portable vacuum module 78 and HVAC module 22, which portable vacuum module 78 engages. Portable vacuum module 78 may have a vacuum module case 82 that defines a vacuum module case interior 96, 98, vacuum fan 84 within the interior of the vacuum module case 82, a vacuum fan drive shaft 86 coupled to vacuum fan 84, a vacuum hose 108 attached to vacuum module case 82, and a detachable canister 106 that attaches to the vacuum module case to capture dust and debris from within vehicle 10, such as from carpeting and upholstery. There is no electric motor within portable vacuum module 78, which instead receives energy for turning fan 84 from electric motor 102 within HVAC case 60. HVAC module 22 may have an HVAC case 60 that defines an aperture 61 through which air may be drawn into HVAC case 60. Electric motor 102 may be disposed within HVAC case 60 with HVAC fan drive shaft 104 coupled to electric motor 102. HVAC fan 58 may be coupled to the HVAC fan drive shaft 104 while vacuum module case 82 attaches to HVAC case 60 or interior panel 68. Vacuum fan drive shaft 86 or second gear drive shaft 92 may be adapted to receive rotational energy from HVAC fan drive shaft 104. Vacuum module case 82 may fit into aperture 76 defined in HVAC case 60 or aperture 80 defined in interior panel 68.

The vehicle vacuum cleaning system may further employ HVAC case aperture cover or stopper 110 to cover HVAC case aperture 112 when the vacuum module 78 is not attached to the HVAC case 60. Packing material 124 may act as a cover or mechanism to prevent HVAC module 22 from drawing air into HVAC case 60 when vacuum module 78 is connected to HVAC case 60 and in use. When vacuum module 78 is not connected and in use, such as when vacuum module 78 is not connected and stowed away, a separate trim piece cover may be affixed over aperture 80 in interior panel 68. A vacuum module wall 94 may divide an interior of vacuum module case 82 interior into first chamber 96 and second chamber 98. First chamber 96 may be occupied by vacuum fan 84 and second chamber 98 may be unoccupied. Vacuum module wall 94 may define a hole 100 through which air is drawn from empty chamber 98 into vacuum fan 84.

First gear 88 may be affixed to vacuum fan drive shaft 86 to which fan 84 may also be attached, and second gear 90 may be affixed on a second gear drive shaft 92. The second gear 90 may engage first gear 88 and second gear drive shaft 92 may protrude from an interior of the vacuum module case 82 to an exterior of the vacuum module case 82. Alternatively, if vacuum fan drive shaft 86 is directly coupled to HVAC fan drive shaft 104, then vacuum fan drive shaft 86 may protrude to an exterior of the vacuum module case 82 to engage HVAC fan drive shaft 104. The second gear drive shaft 92 couples to the HVAC fan drive shaft 86 to receive rotational energy from the HVAC fan drive shaft. Second gear 90 may be larger than first gear 88, which is on vacuum fan drive shaft 86, to obtain an increase in fan speed, fan drawing force and air drawing speed from fan 84.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A vehicle vacuum cleaning system comprising:
   a portable vacuum module comprising:
      a vacuum module case that defines a vacuum module case interior;
      a vacuum fan within the interior of the vacuum module case;
      a vacuum fan drive shaft coupled to the vacuum fan;
      a first gear on the vacuum fan drive shaft; and
      a second gear on a second gear drive shaft, wherein the second gear engages the first gear and the second gear drive shaft protrudes from an interior of the vacuum module case to an exterior of the vacuum module case;
   an HVAC module comprising:
      an HVAC case;
      an electric motor disposed within the HVAC case;
      an HVAC fan drive shaft coupled to the electric motor;
      an HVAC fan coupled to the HVAC fan drive shaft, wherein the portable vacuum module couples onto the HVAC case, and the vacuum fan drive shaft is adapted to receive rotational energy from the HVAC fan drive shaft;

a first HVAC case aperture for the second gear drive shaft to pass through;

an HVAC case aperture cover to cover the HVAC case aperture when the vacuum module is not attached to the HVAC case; and a plurality of springs biasing the HVAC case aperture cover against the HVAC case to cover the first HVAC case aperture.

2. The vehicle vacuum cleaning system of claim 1, wherein the second gear drive shaft couples to the HVAC fan drive shaft to receive rotational energy from the HVAC fan drive shaft.

3. The vehicle vacuum cleaning system of claim 2, wherein the second gear is larger than the first gear on the vacuum fan drive shaft.

4. The vehicle vacuum cleaning system of claim 2, further comprising:

a vacuum module wall that divides the vacuum module case interior into a first chamber and a second chamber, the first chamber occupied by the vacuum fan and the second chamber unoccupied.

5. The vehicle vacuum cleaning system of claim 4, wherein the vacuum module wall defines a hole through which air is drawn from the second chamber into the vacuum fan.

6. The vehicle vacuum cleaning system of claim 1, further comprising:

a vacuum hose that attaches to the vacuum module case.

7. The vehicle vacuum cleaning system of claim 6, further comprising:

a detachable canister that attaches to the vacuum module case to capture dust and debris from within the vehicle.

* * * * *